United States Patent [19]

Keatley

[11] 4,286,642
[45] Sep. 1, 1981

[54] ISOLATION CONNECTION

[75] Inventor: James Keatley, Granada Hills, Calif.

[73] Assignee: Barry Wright Corporation, Watertown, Mass.

[21] Appl. No.: 28,129

[22] Filed: Apr. 9, 1979

[51] Int. Cl.³ .................................... F16B 37/04
[52] U.S. Cl. ........................... 411/112; 29/526 R; 403/406; 411/512
[58] Field of Search ............... 151/41.7 S, 41.76, 41.7, 151/41.71; 85/32 K, 32 R, DIG. 2; 403/406, 407; 24/214, 208 A; 248/73, 74 PB, 74 B; 29/526 R

[56] References Cited
U.S. PATENT DOCUMENTS

| 2,592,130 | 4/1952 | Erb et al. ..................... 24/208 A X |
| 3,595,506 | 7/1971 | Saunders ..................... 248/74 PB X |
| 3,890,680 | 6/1975 | Furuya ........................... 24/214 |
| 3,999,583 | 12/1976 | Nelson ........................... 151/41.75 |
| 4,074,491 | 2/1978 | Bell et al. ..................... 151/41.75 X |

Primary Examiner—Ramon S. Britts
Attorney, Agent, or Firm—Milton E. Gilbert; Gary E. Ross

[57] ABSTRACT

Isolation fasteners for securing one structural part to another in such a way as to minimize transmission of vibration and sound from one part to the other comprising, in combination, fastening means for securing the parts to each other and interposable elastomeric systems designed to be disposed between the parts and about the fastening means.

4 Claims, 4 Drawing Figures

ISOLATION CONNECTION

BACKGROUND OF THE INVENTION

In the aircraft industry, there is a need for securing the interior wall, ceiling and floor panels comprising the fuselage to the frame of the aircraft in such a way as to minimize transfer of vibration and noise from the frame to the component parts of the fuselage. Heretofore, this was accomplished by employing a "noise-absorbing" mat and a floating nut attached to the frame with spring clips. The disadvantages of the present means for attaching the component parts of the fuselage to the frame are that the noise-absorbing mat absorbs moisture, mildews, absorbs and transmits odors and thus requires that it be continually replaced. It is the purpose of this invention to provide a replacement for the aforesaid noiseabsorbing mat and floating nut plate with a combination fastener and isolator which will provide improved vibration and noise isolation, require little or no maintenance or replacement, simplify installation, be fail-safe and not be subject to deterioration, molding and/or a source of unpleasant odor.

SUMMARY OF THE INVENTION

As herein illustrated, the device of this invention is a combination fastener/isolator designed to secure two parts in spaced relation in such a way as to minimize the transmission of vibration and noise from one part to the other. The two parts contain, for this purpose, aligned holes and the device comprises, in combination, an element adapted to be inserted through the holes with retaining means at its opposite ends and an interposable elastomeric system comprising an elastomer body disposed about the portion of the element between the parts, an elastomeric body disposed about the element between the retaining means at one end and the part confronting the retaining means and elastomeric protrusions extending from the respective bodies into the hole about the portion of the element extending through the hole in the part embraced between the elastomeric bodies. Specifically, one of the parts is a supporting structure, for example, the frame of an aircraft and the other part is a wall, ceiling or floor panel which desirably is to be attached thereto and to be isolated therefrom for both vibration and noise. The connecting element is a bolt with a head at one end and a nut at the other end, the hole in the supporting structure is of larger cross section than that of the bolt and the protrusions extend from the respective bodies into the hole of larger diameter about the portion of the bolt extending therethrough. One of the protrusions is of a diameter to fit within the hole of larger diameter and contains a hole within which the protrusion from the other body fits and the latter protrusion has a hole of a diameter to receive the bolt. There are means at the interfaces of the protrusions for locking them in telescoping engagement.

As an item of manufacture, the isolation fastener comprises spaced, flexibly-connected elastomeric bodies having surfaces in a common plane and protrusions extending from said surfaces, said protrusions containing holes, the axes of which are perpendicular to said common plane, the hole in one body being of a cross section to receive the other protrusion. A threaded nut is affixed to the one body in concentric relation to the hole therein. The hole in the other body corresponds in diameter to the threaded hole in the nut. The isolation fastener includes a rigid bolt adapted to be inserted through the holes in the bodies and screwed into the nut. The protrusions are provided with interengageable means for locking them in telescoping engagement.

The invention includes a method for securing parts in isolation from each other comprising providing aligned holes in the parts, one of the holes being of larger diameter than the other, inserting bolts through the aligned holes provided with heads at one end and nuts at the other end and interposing elastomeric bodies between the parts about the bolt between the nuts and the part it confronts and in the enlarged holes about the portions of the bolts extending therethrough.

The invention will now be described in greater detail with reference to the accompanying drawings, wherein.

Figure 1:
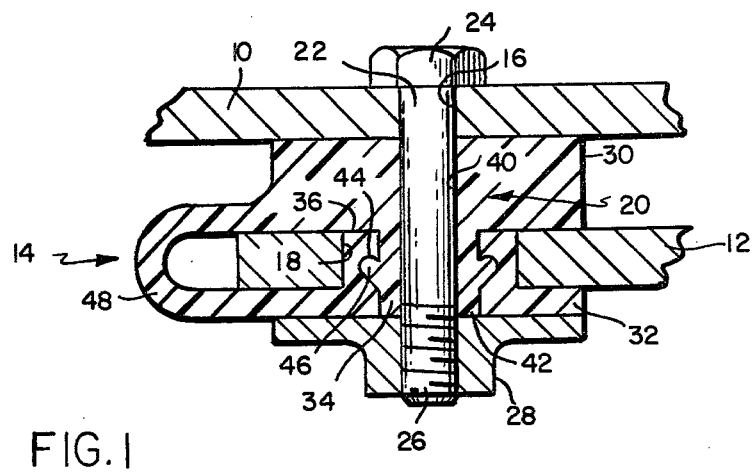
FIG. 1 is a fragmentary view partly in section showing a sectional portion of, for example, a wall panel attached to a sectional portion of, for example, the supporting frame of an airplane with the combination fastener and isolator of this invention.

Referring to FIG. 1 of the drawings, there is shown a portion 10 of a wall, ceiling or floor panel of the fuselage of an airplane secured to supporting 12 which may be part of the airplane frame by means of the isolator/fastener device 14 which constitutes the subject matter of this invention. It is to be understood, however, that the part 10 may be any structure which is desirably supported from a structure 12 in such a manner as to minimize transmission of vibration and sound from the structure 12 to the structure 10 and so the device 14 is not limited in its use to airplane manufacturing.

For fastening of the two parts 10 and 12 which will be referred to as the isolated or supported structure and the supporting structure, respectively, there are provided aligned holes 16 and 18 for receiving a fastening element 20 in the form of a bolt provided with a shank portion 22, a head 24 and a threaded end 26 adapted to receive a nut 28. The hole 16 in the isolated or supported structure 10 corresponds in diameter to the shank of the bolt, and the hole 18 in the supporting structure 12 is of larger diameter than the shank of the bolt.

The isolator component of the isolation fastener 14 comprises an elastomeric body 30 disposed between the opposed surfaces 10 of the supported structure and the supporting structure 12 about the shank 22 of the bolt, an elastomeric body 32 disposed between the nut 28 and the supporting structure 12 about the shank of the bolt and elastomeric protrusions 34 and 36 extending from their respective elastomeric bodies 30 and 32 into the hole 18 about the portion of the shank 22 extending through the hole 18. The elastomeric body 30 and its protrusion 34 contain a hole 40 of a diameter to receive the shank 22 of the bolt and the protrusion 34 has an outside diameter which is less than the inside diameter of the hole 18. The elastomeric body 32 and its protrusion 36 contain an opening 42 of a diameter to receive the protrusion 34 and the protrusion 36 itself is of an outside diameter to fit closely into the hole 18. At the interfaces of the two protrusions 34 and 36, there are, respectively, an annular groove 44 and a lip 46 which are interengaged and hold the protrusions in telscoping relation to each other. The nut 28 is screwed onto the threaded portion 26 of the bolt against the body 32. As thus assembled, the bolt, while securing the two parts together, is isolated from the supporting structure 12 so that there is no rigid component between the supporting structure 12 and the bolt for transmitting vibration or noise from the supporting structure 12 to the supported structure 10.

Figure 3:
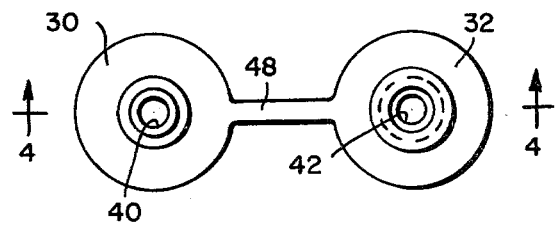
FIG. 3 is a top plan view of FIG. 2.
Figure 2:
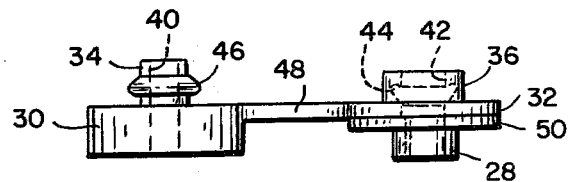
FIG. 2 is an elevation of the combination fastener and isolator as an item of manufacture before installation.
Figure 4:
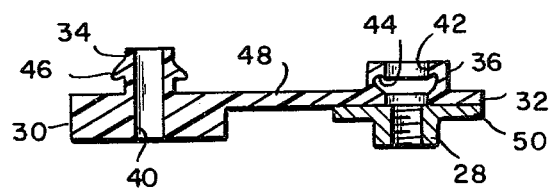
FIG. 4 is a section taken on the line 4—4 of FIG. 3.

The isolator component of the isolator fastener is shown prior to its installation in FIGS. 2, 3, and 4 wherein the elastomeric body 30 is of circular cross section, the elastomeric body 32 is of circular cross section and the two bodies 30 and 32 are connected by a linking elastomeric body 48. The upper surface of the bodies 30 and 32 are situated in a common plane and each of the bodies 30 and 32 has at its geometric center a protrusion 34 and 36, respectively. The protrusions 34 and 36 extend upwardly from the bodies 30 and 32 and are of circular cross section. The holes 40 and 42 extend through the body portions 30 and 32 and their extensions 34 and 36 respectively. The protrusions are integral portions of the bodies 30 and 32, and the groove 44 and lip 46 are formed as a part thereof. The nut 28 is provided with a flange 50 by means of which it is attached to the body 32.

As thus constructed, the body 30 is flexibly connected to the body 32 so that it may be disposed in superimposed relation with the body 32 by folding of the linking connection 48 and applied to the supporting structure 12 by interengaging the telescoping protrusions 34 and 36. It then becomes a relatively simply matter to mount the supported structure 10 on the elastomeric body 30, align the holes 16 therein with the hole 18 in the elastomeric body 32, insert a bolt 24 therethrough and through the protrusions into the nut 28 which is supported at the lower side of the supporting structure 12 by the isolator and so does not require access to the underside of the supporting structure 12 for making an installation.

The combination device as described is inexpensive to manufacture, easy to install, an excellent insulator for preventing transmission of noise and vibration and is not susceptible to deterioration nor the absorption of moisture or odors which would require replacement.

It should be understood that the present disclosure is for the purpose of illustration only and includes all modifications or improvements which fall within the scope of the appended claims.

I claim:

1. An isolation connection for minimizing transmission of vibration and noise from one part to another, said isolation connection comprising in combination: first and second parts having opposing surfaces with aligned holes therethrough, an isolation fastener element inserted through the holes with retaining means at its ends and an interposable integrally-constructed system of elastomeric material comprising (A) a first elastomeric body disposed about the portion of the element between the parts, said first elastomeric body being mounted on and between the opposing surfaces of the parts so as to have elastomeric material confronting each of the parts, (b) a second elastomeric body disposed about the element and between the retaining means at one end and the part confronted by the retaining means so as to have elastomeric material confronting said part and said retaining means at one end, and (c) elastomeric protrusions extending from the respective elastomeric bodies into the hole in the part embraced between the elastomeric bodies and about the portion of the element extending through said hole, said protrusions embodying means interlocking one elastomeric body with the other.

2. An isolation connection according to claim 1 wherein one of the protrusions contains a hole corresponding in cross section to said element receiving said element, the other a hole corresponding in cross section to the one protrusion receiving said one protrusion and an outside cross section corresponding to the cross section of one of the aligned holes in the parts, and interengageable means at the interfaces of the protrrusions locking them to each other within the hole.

3. An isolation connection according to claims 1 or 2 wherein said element is a bolt and the retaining means are a head at one end and a nut at the other end and wherein the nut is affixed to one of said elastomeric bodies.

4. A method for securing a first and a second part in isolation from each other, comprising:
 (a) providing aligned holes in the parts to be secured;
 (b) disposing, in superimposed relation, two bodies of an integrally-constucted elastomeric comprising said two bodies and a flexible link connecting said two bodies, and wherein each body includes a protrusion having a hole therethrough, said protrusions including means for interengaging one with the other, said elastomeric comprised of elastomeric material;
 (c) said disposing step including folding said elastomeric along said flexible link;
 (d) interposing a first of said bodies between the first part and a nut in such manner as to dispose said first body's protrusion in the hole of said first part;
 (e) interposing a second of said bodies between the parts to be secured, said step including mounting the second body on said second part so as to have elastomeric material confronting said second part, and disposing said second body's protrusion in the hole of said first part and in interengagement with said first body's protrusion, and in so doing telescoping said protrusions;
 (f) inserting a bolt through the aligned holes of the parts, and through the two bodies and their telescoped protrusions, and into said nut; and
 (g) whereby said elastomeric is disposed between said parts, between each part and the bolt, and between said first part and said nut.

* * * * *